United States Patent Office 3,660,461
Patented May 2, 1972

3,660,461
N-CYCLOALKYL-N'-CYANOALKYL ALKOXYBENZAMIDES
William D. Roll, Toledo, Ohio, assignor to The University of Toledo, Toledo, Ohio
No Drawing. Filed May 5, 1969, Ser. No. 822,029
Int. Cl. A61k 27/00; C07c 121/78
U.S. Cl. 260—465 D         5 Claims

ABSTRACT OF THE DISCLOSURE

Simultaneously acting central nervous system (CNS) depressants and blood pressure depressors of the formula

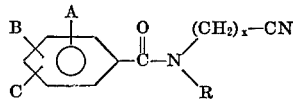

wherein A, B, and C are selected from the group consisting of hydrogen, lower alkyl, lower alkoxy, and halogen radicals at least one of which is an alkoxy or a halogen radical; wherein $x$ is a whole number from one to three, and wherein R is selected from the group consisting of cycloaliphatic radicals containing between three and seven carbon atoms.

BACKGROUND OF THE INVENTION

Although similar N-cyanoalkyl benzamides are known, no similar ones were found which had either, not to mention both, the CNS depressant and blood pressure depressor effects of applicant's new compounds. For example; the Pursglove U.S. Pat. No. 2,927,126, patented Mar. 1, 1960 is for a biocide, and the Saxon Pat. No. 3,172,869, patented Mar. 9, 1965 is for a plasticizer.

Although similar N-cycloalkyl benzamides are known, they only had biocide or CNS depressant effects, and none were blood pressure depressors.

Furthermore, no N-cycloalkyl-N'-cyanoalkyl ring-substituted benzamides have been found.

SUMMARY OF THE INVENTION

(A) The compounds

The new compounds of this invention have central nervous system activity, stimulation or depression in small animals such as rats and mice, depending upon the dosage (2 to 4 mg./kg.), and when they act as depressants in their larger dosages, they also produce a drop in blood pressure in these animals.

These new compounds have the general formula:

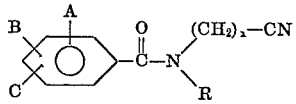

wherein A, B, and C may be mono-, di-, or tri-fluoro-, chloro-, bromo-, iodo-, methoxy-, or ethoxy- radicals, and may be mono- or di-methyl-, or ethyl- radicals, but preferably chloro- or methoxy-radicals substituted in the ortho-, meta-, and para-positions, but preferably in the meta- or para-positions, of the phenyl ring of the benzamide. The cyanoalkyl radical of the benzamide may comprise a cyano-methyl-, ethyl-, or propyl-radical, but preferably the cyanoethyl-radical, while the R radical may comprise a tri-, quatra-, penta-, hexa-, or hepta-cycloaliphatic radical, preferably the cyclohexyl radical, which together with the halo- or methoxy-radicals on the phenyl ring of the benzamide confers the proper physico-chemical properties on these compounds which are necessary for maximal activity in the animals tested. Although the N-cyanoethyl-radical is preferred, the N-cyanopropyl-radical also is good, but the N-cyanomethyl is less effective, and those N-cyanoalkyl radicals of four or more carbon atoms produce no significant depressant action in any practical dosages.

(B) Their preparation

The new compounds according to this invention were prepared by the modification of the Schotten-Baumann Reaction according to the following equation:

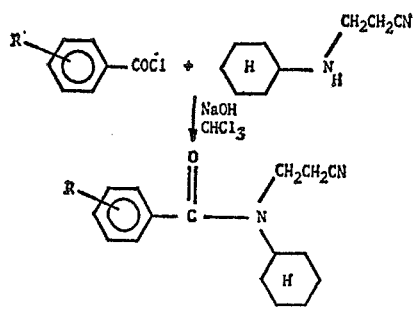

Herein an acyl halide was reacted with an N-(2-cyanoalkyl)-cycloalkylamine in the presence of sodium hydroxide and chloroform at room temperature and agitated until the exothermic reaction was complete. The chloroform layer was then washed with water, dried with anhydrous sodium sulfate and evaporated in a vacuum to produce a viscous yellow oil which crystallized on standing for a period of several weeks. This crude product was then re-crystallized from aqueous ethanol to give the pure new compounds of this invention, which were tested for composition and physical properties. The results of some of these tests on the preferred N-cyclohexyl-N-cyanoethyl-methoxy- and chlorobenzamides are shown in the following Table I:

TABLE I

| Example No. | Phenyl ring substituted radical | Percent yield by above process | Melting point in °C. | Ultra violet data | | Infrared absorption | | Calculated, percent | | Analyzed, percent | |
|---|---|---|---|---|---|---|---|---|---|---|---|
| | | | | λ, mμ | ε | C=O | CN | C | H | C | H |
| 1 | p-CH₃O— | 76.8 | 77–78 | 282 | 1,679 | 1,630 | 2,265 | 71.30 | 7.74 | 71.33 | 7.78 |
| 2 | m-CH₃O— | 75.0 | | 282 | 2,040 | 1,630 | 2,265 | 71.30 | 7.74 | 71.77 | 7.83 |
| 3 | o-CH₃O— | 74.5 | 43–44 | 282 | 2,611 | 1,630 | 2,265 | 71.30 | 7.74 | 71.45 | 7.80 |
| 4 | p-Cl— | 79.4 | 93–94 | 266 | 1,500 | 1,630 | 2,265 | 66.08 | 6.48 | 66.20 | 6.50 |
| 5 | m-Cl— | 75.0 | 48–49 | 266 | 757 | 1,630 | 2,265 | 66.08 | 6.58 | 66.12 | 6.63 |
| 6 | o-Cl— | 78.4 | 56–57 | 266 | 391 | 1,630 | 2,265 | 66.08 | 6.58 | 66.14 | 6.60 |

(C) Their pharmacology

The activity of these new compounds was tested by dissolving them in propylene glycol and injecting their resulting solutions into small animals such as rats and mice in dosages of two and of four milligrams per kilogram of weight of the animal injected. The depressant or stimulatory effects of the new compounds were determined in mice with actophotometers which measure the total movements of a single animal each thirty minute interval over a two hour period and the mean count for each period for twelve animals for each compound was recorded. The direct blood pressure measurements for these new compounds were conducted in eight Wistar rats for each compound, which rats were under urethan anesthesia, 1.2 g./kg. i.p., with a mercury monometer connected to the carotid artery. The solutions of these new compounds were injected via the femoral vein. Indirect blood pressure measurements were conducted in normotensive Wistar rats using a photoelectric tensometer.

The results of these pharmacological tests for the new compounds listed in Table I above are shown in the following two Tables II and III for 4 mg./kg. and 2 mg./kg. doses, respectively, the latter or smaller doses having no significant effect on the blood pressure:

TABLE II

[At dosage 4 mg./kg. in mice]

| Compound of— | Relative depressor action on— | |
|---|---|---|
| | Central nervous system (CNS) | Blood pressure |
| Example number: | | |
| 1 | ++++++ | ++++++ |
| 2 | ++++ | +++++ |
| 3 | ++ | ++ |
| 4 | +++++ | ++++ |
| 5 | +++ | +++ |
| 6 | + | + |

TABLE III

[At dosage 2 mg./kg. in mice]

| Compound of— | Relative stimulation of central nervous system (CNS) |
|---|---|
| Example number: | |
| 1 | +++++++ |
| 2 | ++++ |
| 3 | (Depressor.) |
| 4 | +++++ |
| 5 | (Stimulation then depression.) |
| 6 | (Depressor.) |

DETAILED DESCRIPTION OF SOME PREFERRED EMBODIMENTS

Example 1

N - cyclohexyl-N-cyanoethyl-p-methoxybenzamide was prepared by shaking a mixture of 15 milliliters of chloroform, 0.01 mole of N-(2-cyanoethyl) cyclohexylamine, 60 milliliters of 5% sodium hydroxide, and 0.01 mole of p-chloro-acyl chloride in a separator at room temperature until the exothermic action was complete. The chloroform layer was washed with water, dried with anhydrous sodium sulfate, and evaporated in a vacuum to produce a viscous yellow oil which crystallized on standing for a period of several weeks. These crude crystals were then re-crystallized from aqueous ethanol to form the pure N-cyclohexyl-N-cyanoethyl-p-methoxybenzamide sample of this example.

This sample was then tested according to the Table I above in which the carbon and hydrogen content or percentages were obtained with a Coleman carbon-hydrogen analyzer. The melting point was determined by using a Mettler FP–1 melting and boiling point apparatus. The infrared absorption spectra were obtained with a Perkin-Elmer Model 137–B spectrophotometer, and the ultra violet data were obtained with a Bausch and Lomb Spectronic 600 Spectrophotometer.

The oral administration of four milligrams per kilogram of this Example 1 compound dissolved in propylene glycol resulted in a significant reduction in the spontaneous motor activity of the mice and rats as well as causing a simultaneous drop in blood pressure (see Table II above). Ataxia was clearly discernible in the animal at elevated dosages such for example ten milligrams per kilogram, and a rat responded even more dramatically to such elevated dosages, by assuming a cataleptoid posture. Slightly lower dosages on the other hand, say of two milligrams per kilogram of this new Example 1 compound, produced excitation in mice (see Table III above), and rather effectively antagonized the tranquilizing activity of orally simultaneously administered 0.4 milligram doses of perphenazine. This new compound also produced a significant hypotensive effect when administered intraperitoneally to unanesthetized normotensive rats.

Example 2

N-cyclohexyl-N-cyanoethyl-m-methoxybenzamide was prepared from m-methoxy acyl chloride and N-(2-cyanoethyl) cyclohexylamine in the same manner as that employed in Example 1 above, except that it was purified by chromatography on silica gel and eluted with petroleum ether, instead of being recrystallized for its purification. The resulting compound was also tested as described in Example 1 above, and as shown in Tables I, II, and III above, to act in doses of 4 mg./kg. both as a CNS depressant and a blood pressure depressor.

Example 3

N - cyclohexyl-N-cyanoethyl-o-methoxybenzamide also was produced in the manner described in Example 1 above and similarly tested as described therein and as shown in the above Tables I, II, and III, and was shown to have both CNS depressant and blood pressure depressor activity in dosages of 4 mg./kg.

Example 4

N-cyclohexyl-N-cyanoethyl-p-chlorobenzamide was also produced according to the process described for Example 1 above and similarly tested as shown in Table I.

Oral doses of this compound of two milligrams per kilogram in propylene glycol produced a high degree of excitation but its antagonism to 0.4 milligram per kilogram doses of perphenazine was insignificant. Although depression was the predominant symptom of animals receiving doses of four milligram per kilogram of this new compound of Example 4, the degree of reduction in spontaneous motor activity was less than that for the compound of Example 1. It also was a blood pressure depressor as shown in Table II above.

Example 5

N-cyclohexyl-N-cyanoethyl - m - chlorobenzamide was also produced similar to the process described in Example 1, and it had pharmacological effects similar to those for the compound of Example 2 as shown in Table II. However, in smaller dosages, as shown in Table III, it caused excitation during the first hour of measurement, but the spontaneous activity of mice receiving this reduced dosage rapidly decreased during the next one and a half hour period.

Example 6

N-cyclohexyl-N-cyanoethyl - o - chlorobenzamide was produced according to the process described for Example 1 and was tested to have properties and an activity slightly less than the compound of Example 3.

I claim:
1. A compound of the formula

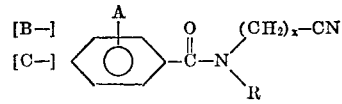

wherein A is selected from the group consisting of para and meta methoxy and ethoxy radicals, wherein $x$ is a whole number from one to three, and wherein R is selected from the group consisting of cyclopropyl, cyclobutyl, cyclopentyl, cyclohexyl, and cycloheptyl radicals.

2. A compound according to claim 1 wherein $x$ is 2.

3. A compound according to claim 1 wherein said R is cyclohexyl radical.

4. N-cyclohexyl-N-cyanoethyl-p-methoxybenzamide.

5. N-cyclohexyl-N-cyanoethyl-m-methoxybenzamide.

References Cited

UNITED STATES PATENTS

| 2,927,126 | 3/1960 | Pursglove | 260—465 |
| 3,457,294 | 7/1969 | Crovetti et al. | 260—465 |

JOSEPH REBOLD, Primary Examiner

D. H. TORRENCE, Assistant Examiner

U.S. Cl. X.R.

260—464; 424—304